(12) United States Patent
Yen (10) Patent No.: US 7,705,569 B2
(45) Date of Patent: Apr. 27, 2010

(54) SLOPE RATE COMPENSATION CIRCUIT, METHOD THEREOF AND PULSE WIDTH MODULATION BOOST CONVERTER CIRCUIT

(75) Inventor: Chih Yueh Yen, Hsinchu (TW)

(73) Assignee: Advanced Analog Technology, Inc., Hsinchu (TW)

( * ) Notice: Subject to any disclaimer, the term of this patent is extended or adjusted under 35 U.S.C. 154(b) by 141 days.

(21) Appl. No.: 12/179,173

(22) Filed: Jul. 24, 2008

(65) Prior Publication Data

US 2009/0206815 A1 Aug. 20, 2009

(30) Foreign Application Priority Data

Feb. 20, 2008 (TW) ................ 97105844 A (51) Int. Cl.
*G05F 1/00* (2006.01)
(52) U.S. Cl. .............. 323/222; 323/282; 323/288
(58) Field of Classification Search .......... 323/282, 323/288, 222, 293
See application file for complete search history.

(56) References Cited

U.S. PATENT DOCUMENTS

| 5,001,620 | A | * | 3/1991 | Smith ................ 323/222 |
| 5,717,322 | A | | 2/1998 | Hawkes et al. |
| 6,522,116 | B1 | | 2/2003 | Jordan et al. |
| 6,611,131 | B2 | | 8/2003 | Edwards et al. |

* cited by examiner

*Primary Examiner*—Shawn Riley
(74) *Attorney, Agent, or Firm*—WPAT, P.C.; Anthony King (57) ABSTRACT

A slope rate compensation circuit includes a source follower level-shift amplifier, a capacitor, a first resistor and a second resistor. The source follower level-shift amplifier includes a first transistor and a second transistor. The first transistor allows a first current to flow therein, the second transistor allows a second current to flow therein, and the first current increases with the second current. The capacitor is connected to the source terminal of the first transistor. The first resistor is connected to the source terminal of the second transistor. The second resistor allows a third current to flow therein, and the third current increases with the second current. The second resistor is related to the output voltage of the slope rate compensation circuit.

18 Claims, 9 Drawing Sheets

SLOPE RATE COMPENSATION CIRCUIT, METHOD THEREOF AND PULSE WIDTH MODULATION BOOST CONVERTER CIRCUIT

BACKGROUND OF THE INVENTION

1. Field of the Invention

The present invention relates to a slope rate compensation circuit, method thereof and pulse width modulation (PWM) boost converter circuit, and more particularly, to a slope rate compensation circuit, method thereof and pulse width modulation boost converter circuit using a constant increasing slope rate.

2. Description of the Related Art

Figure 1:
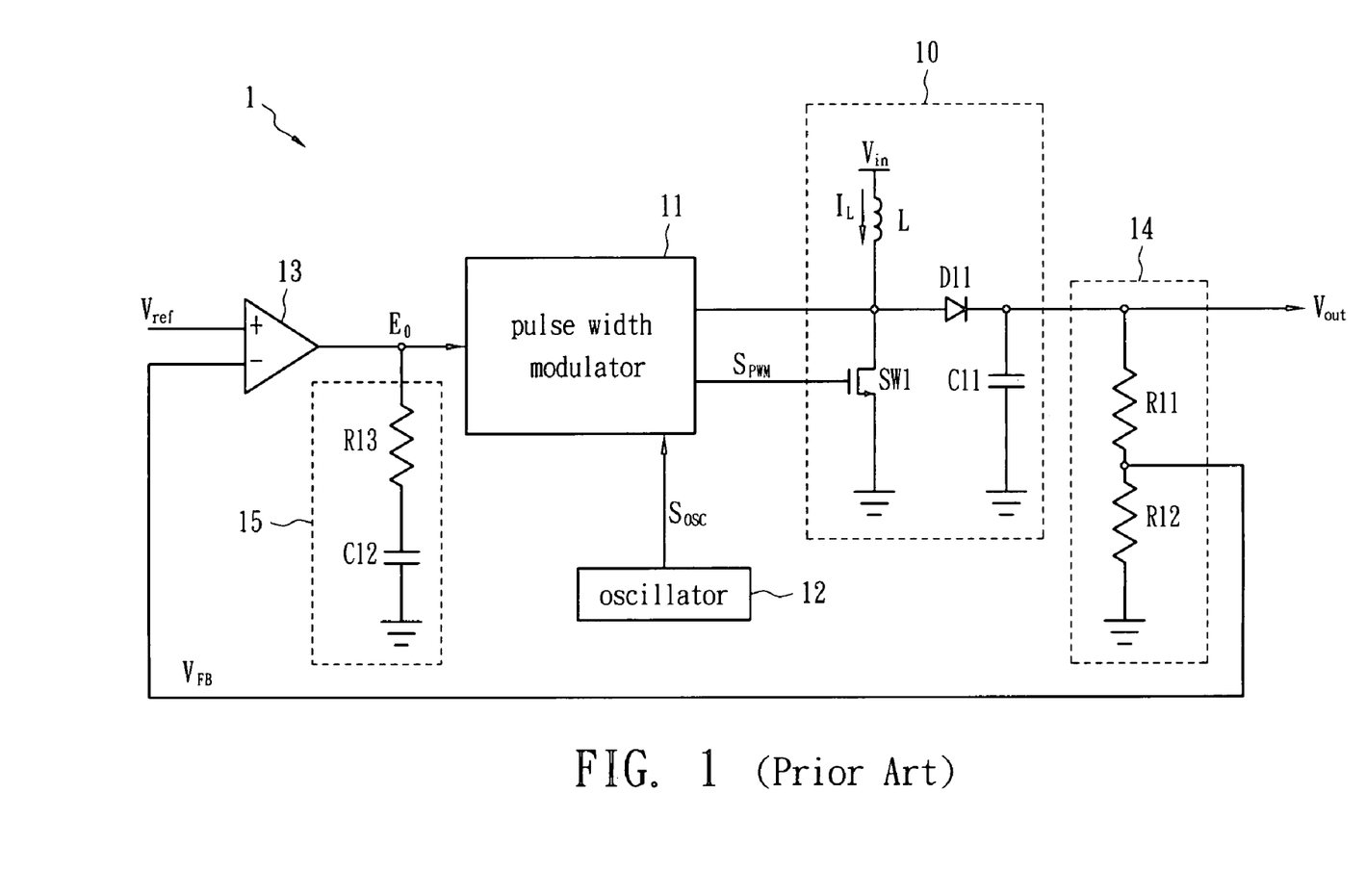
FIG. 1 shows a known pulse width modulation boost converter circuit.

FIG. 1 shows a known pulse width modulation boost converter circuit 1, which comprises a boost converter circuit 10, a pulse width modulator 11, an oscillator 12, an error amplifier 13, a voltage divider 14 and a compensation circuit 15. When the pulse width modulation boost converter circuit 1 is activated, a reference voltage $V_{ref}$ is applied to the non-inverting input of the error amplifier 13. Meanwhile, the inverting input of the error amplifier 13 is connected to a feedback voltage $V_{FB}$ of the voltage divider 14 to define the magnitude of the DC output voltage $V_{out}$. The oscillator 12 outputs a pre-oscillating signal $S_{OSC}$ to the pulse width modulator 11 so as to generate a PWM signal $S_{PWM}$. The PWM signal $S_{PWM}$ enables the transistor switch SW1, increasing the inductor current and storing energy in the inductor magnetic field. The output Eo of the error amplifier is compared with a constant-frequency sawtooth wave to determine the disabling duration of the switch SW1, so that the inductor current $I_L$, generated by the input voltage $V_{in}$, flowing through the boost inductor L, is capable of intermittently charging the capacitor C11 and thus increases the DC output voltage $V_{out}$. The diode D11 limits charge current direction of the capacitor C11. When SW1 is disabled, D11 is forward biased.

A PWM boost converter circuit is applied to either the circuit mode PWM control or to voltage mode PWM control. The current mode PWM control uses inductor current as a feedback signal, and thus exhibits a superior loop performance over the voltage mode PWM control. In addition, without a leading compensation, the current mode PWM control has a phase margin 90 degrees more than does the voltage mode PWM control, and thus is more stable.

Generally, if the duty ratio of a PWM switching regulator is greater than 50% in the current mode PWM control, it is necessary to conduct a slope rate compensation. The compensated slope rate ma must satisfy the criteria $$\frac{m2}{2} < ma$$

so as to avoid unstable and inefficient situations. When ma is equal to m2, it represents the optimal compensation slope rate, where −m2 is the slope rate of the inductor current when the transistor switch SW1 is disabled.

Figure 2:
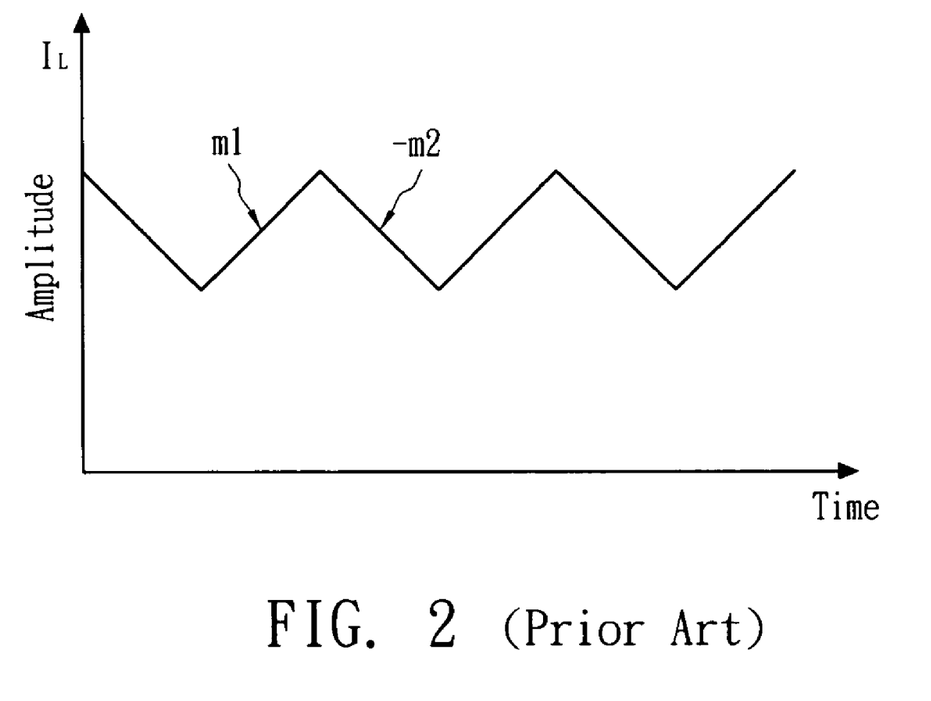
FIG. 2 shows a waveform of the inductor current $I_L$ of the PWM boost converter circuit.

FIG. 2 shows a waveform of the inductor current $I_L$ of the PWM boost converter circuit 10. As shown in FIG. 2, the slope rate m1 of the inductor current is $$\frac{V_{in}}{L}$$

when the transistor switch SW1 is enabled, the slope rate −m2 of the inductor current is $$\frac{V_{out} - V_{IN}}{L}$$

when the transistor switch SW1 is disabled, and $$V_{out} = V_{in} \times \frac{1}{(1 - \text{duty ratio})}.$$

Therefore, if ma is equal to m2, $$ma = \frac{V_{in}}{L} \times \frac{\text{duty ratio}}{(1 - \text{duty ratio})}.$$

The primary difficulty in determining proper slope rate compensation is that the input and output voltages of the PWM boost converter circuit 10 are variable, as is the duty ratio; therefore it is not easy to locate a corresponding variable slope rate compensation.

U.S. Pat. No. 6,611,131 discloses a piecewise-linear slope rate compensation, which adopts resistors to detect inductor current and uses a BJT transistor to conduct the slope rate compensation. First, it results in a greater power consumption. Second, the level of voltage clamping shifts with the voltage source, so the design is more complicated. Third, the current limit is achieved by clamping the feedback signal of the inductor current, but the current limit level is distorted after a summation is performed with the slope rate compensation signal.

Figure 3A:
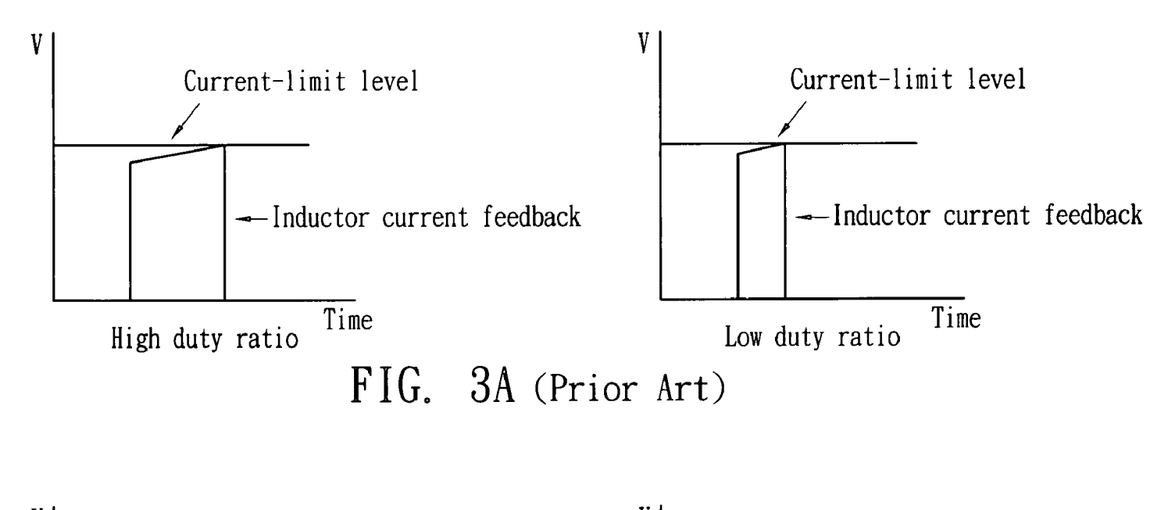
FIG. 3A shows output voltage waveforms of the current sense feedback circuit in high duty ratio and low duty ratio operations without slope rate compensation.
Figure 3B:
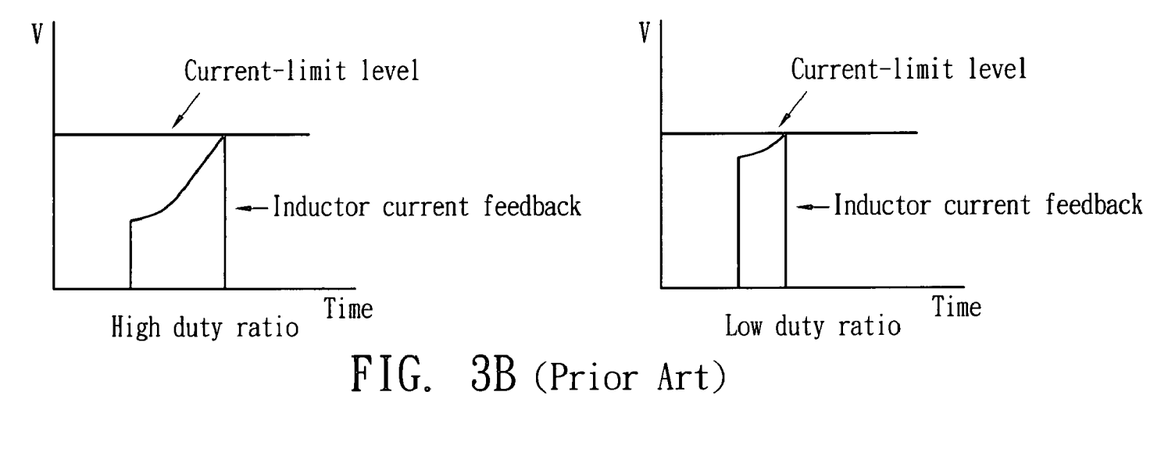
FIG. 3B shows output voltage waveforms of the current sense feedback circuit in high duty ratio and low duty ratio operations with slope rate compensation.

FIG. 3A shows output voltage waveforms of high duty ratio and low duty ratio without slope rate compensation, and FIG. 3B shows output voltage waveforms of high duty ratio and low duty ratio with slope rate compensation. As can be seen in FIG. 3B, the output voltage of high duty ratio with slope rate compensation reaches the circuit limit level more easily than the output voltage of low duty ratio with a slope rate compensation voltage since a larger slope rate is added.

U.S. Pat. No. 6,522,116 discloses another slope rate compensation technique, which must detect the variation of the output voltage before a slope rate compensation is conducted. However, detecting the variation of the output voltage itself is a difficult task. Since generally, the monolithic IC has no access to the output voltage, if the detection circuit exhibits an inaccurate performance due to oversimplification, the overall performance is decreased. In addition, this prior art adopts a large resistor to perform a linear effect, thus resulting in excessive power consumption.

U.S. Pat. No. 5,717,322 discloses another slope rate compensation technique. Since its compensated slope rate is constant, its performance varies with the duty ratio.

Because the known prior arts have these drawbacks listed above, it is necessary to design an easily-manufactured, power-saving slope rate compensation technique whose slope rate is variable with the working duty ratio.

SUMMARY OF THE INVENTION

The slope rate compensation circuit according to an embodiment of the present invention includes a source follower level-shift amplifier, a capacitor, a first resistor and a second resistor. The source follower level-shift amplifier includes a first transistor and a second transistor. The first transistor allows a first current to flow therein, the second transistor allows a second current to flow therein, and the first current increases with the increase of the second current. The capacitor is connected to the source terminal of the first transistor. The first resistor is connected to the source terminal of the second transistor. The second resistor allows a third current to flow therein, and the third current increases with the increase of the second current. The second resistor is related to the output voltage of the slope rate compensation circuit.

The slope rate compensation circuit according to an embodiment of the present invention includes a compensation unit, a transconductance amplifier and a current mirror. The increase rate of the compensation unit output voltage slope rate is constant. The transconductance amplifier is configured to detect the current value of the inductor. The current mirror is configured to amplify the output current of the transconductance amplifier to the compensation unit with a predetermined ratio.

The pulse width modulation (PWM) boost converter circuit according to an embodiment of the present invention comprises a slope rate compensation circuit, a boost converter circuit, a voltage divider, an error amplifier, a pulse width modulator and a PWM logic circuit. The boost converter circuit has an inductor and a transistor switch. The voltage divider is connected to the output terminal of the boost converter circuit. The error amplifier has an inverting input connected to the output terminal of the voltage divider. The pulse width modulator has one input terminal connected to the output of the error amplifier, and another input terminal is connected to the output voltage of the compensation unit of the slope rate compensation circuit. The PWM logic circuit has one input terminal connected to the output terminal of the pulse width modulator.

The slope rate compensation method according to an embodiment of the present invention includes the steps of detecting an inductor current and generating a feedback signal accordingly; generating a slope rate compensation signal having a constant increasing slope rate, wherein the variation of the slope rate is proportional to the duty ratio of a PWM control; summing the inductor current feedback signal and the slope rate compensation signal to generate a sawtooth signal; and utilizing the sawtooth signal to perform a current-mode PWM control.

BRIEF DESCRIPTION OF THE DRAWINGS

The invention will be described according to the appended drawings in which.

PREFERRED EMBODIMENT OF THE PRESENT INVENTION

Figure 4:
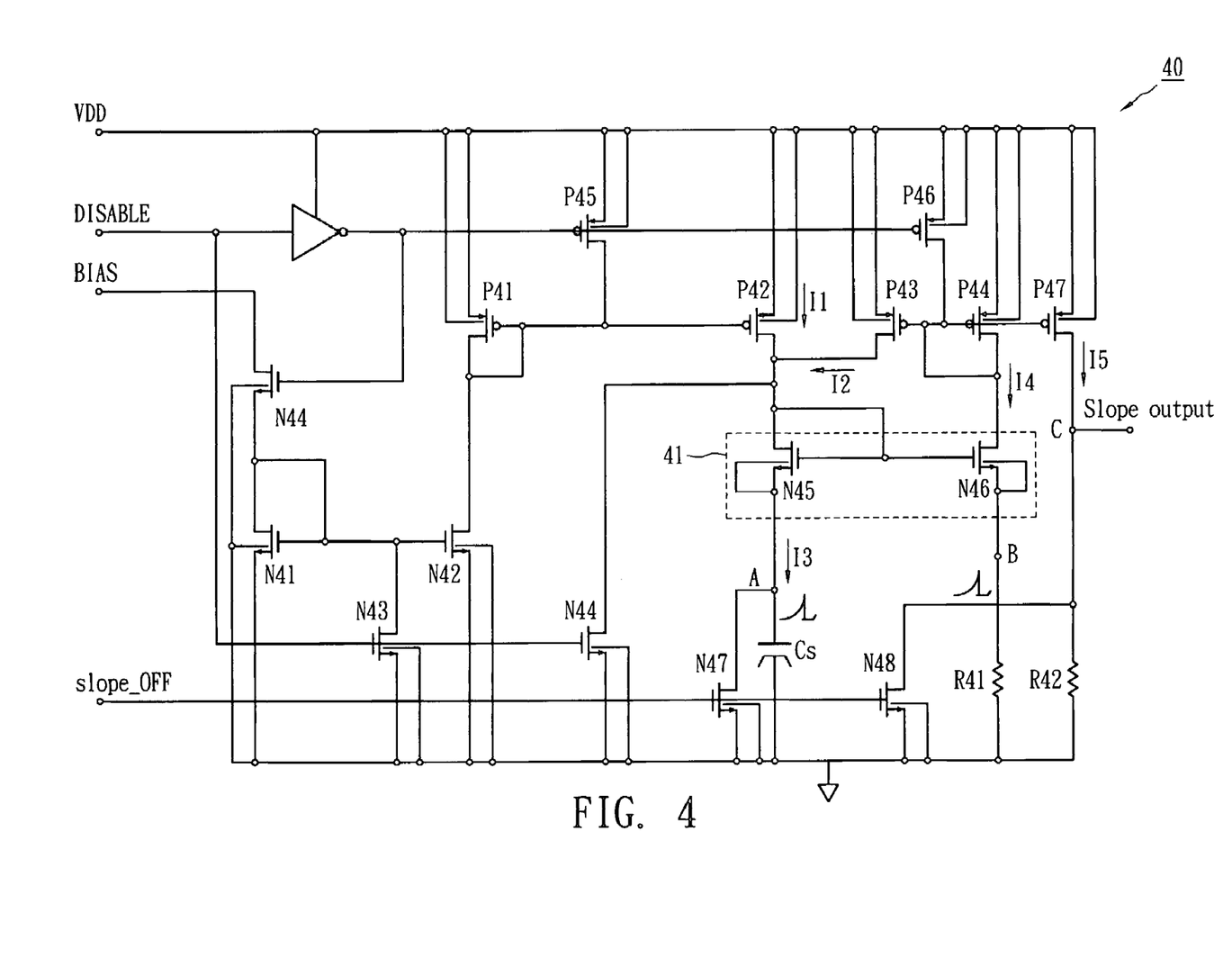
FIG. 4 depicts a slope rate compensation circuit according to one embodiment of the present invention.

FIG. 4 depicts a slope rate compensation circuit 40 according to one embodiment of the present invention. The left half part of the slope rate compensation circuit 40 forms a current source, and the right half part of the slope rate compensation circuit 40 provides a variable-slope output. Transistors P41 and P42 constitute a pair of circuit mirrors, and transistors P43, P44 and P47 constitute another set of current mirrors. Assuming that the transistors P43, P44 and P47 have the same size, then currents I2, I4 and I5 all equal to the quotient of the node B voltage divided by the resistance of the resistor R1. The current flowing through the transistor N45, I3 is the sum of I1 and I2. The slope rate of the node A voltage can be calculated from the equation $$\frac{dV_A}{dt} = \frac{I1+I2}{C}.$$

The transistors N45, N46 constitute a source follower level shift circuit 41. If the transistors N45, N46 have the same size, node A voltage is close to the node B voltage. A relation of $$\frac{dV_A}{dt} = \frac{I1+I2}{C} = \frac{I1+V_A \times t/R1}{C}$$

can be obtained, where $$\left(\frac{dV_A}{dt}\right)' = \frac{1}{R1 \times C}.$$

In other words, the second derivative with respect to time of the voltage is a constant, i.e., its increasing slope rate is a constant. The node C voltage of the slope rate compensation circuit 40 is $$V_C = I5 \times R2 = \frac{V_B \times R2}{R1} = V_A \times \frac{R2}{R1}.$$

Therefore the node C voltage possesses the same characteristics as the node A voltage, i.e., a variable slope rate and a constant increasing slope rate.

Figure 5:
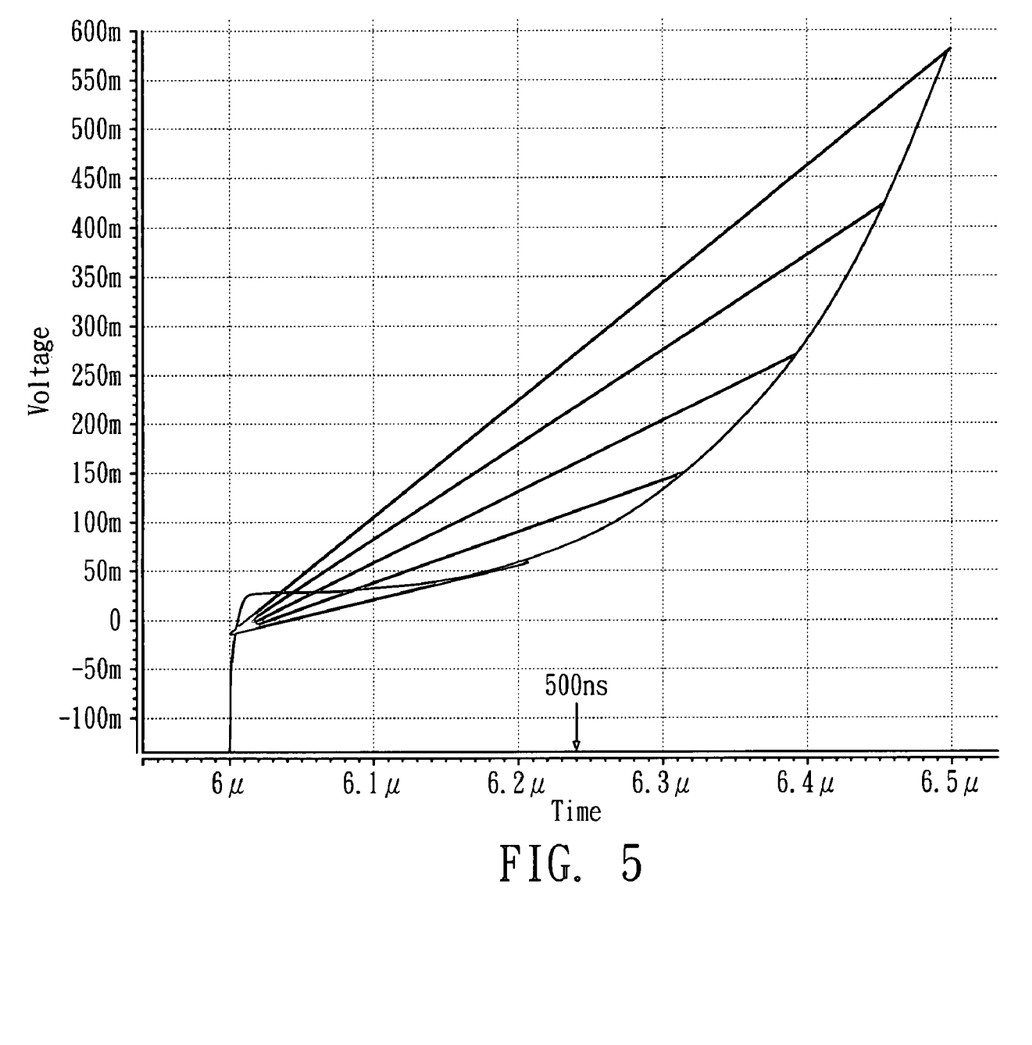
FIG. 5 shows that the slope variation is increased with the duty ratio of the inductor current.

FIG. 5 shows that the slope variation is increased with the duty ratio of the inductor current.

Figure 6:
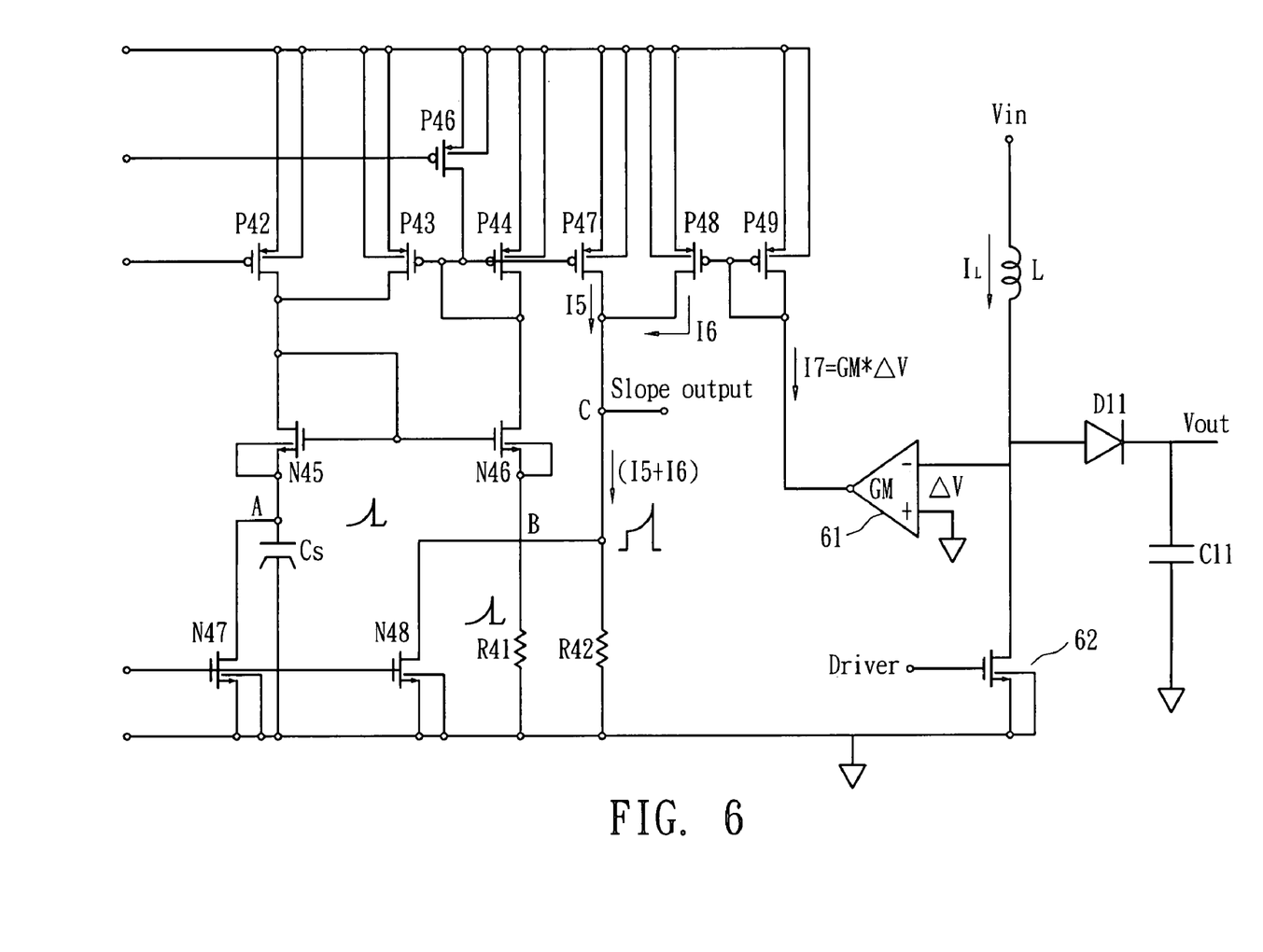
FIG. 6 shows a slope rate compensation circuit in accordance with an embodiment of the present invention.

FIG. 6 shows a slope rate compensation circuit in accordance with an embodiment of the present invention. A transconductance amplifier 61 is employed to convert the input voltage difference into current. Because the input voltage difference can be calculated as the equation as $\Delta V = I_L \times R_{on}$, where $I_L$ denotes the current flowing through inductor L, $R_{on}$ denotes an equivalent resistance when the transistor switch 62 is on, the output current I7 of the transconductance amplifier 61 equals to $GM \times \Delta V$. Assuming the transistors P48, P49 have the same size and transistors P48, P49 constitute a current mirror, then I6 is equal to I7, and the node C voltage is equal to $R2 \times (I5+I7) = R2 \times (I5+GM \times I_L \times R_{on})$. Therefore, the slope rate compensation circuit and method of the present invention can sum the feedback signal of the inductor current and slope rate compensation signal to act as the sawtooth signal for current-mode PWM control, which is then outputted to one of the pulse width modulator 82 inputs, as shown in FIG. 8.

Figure 7:
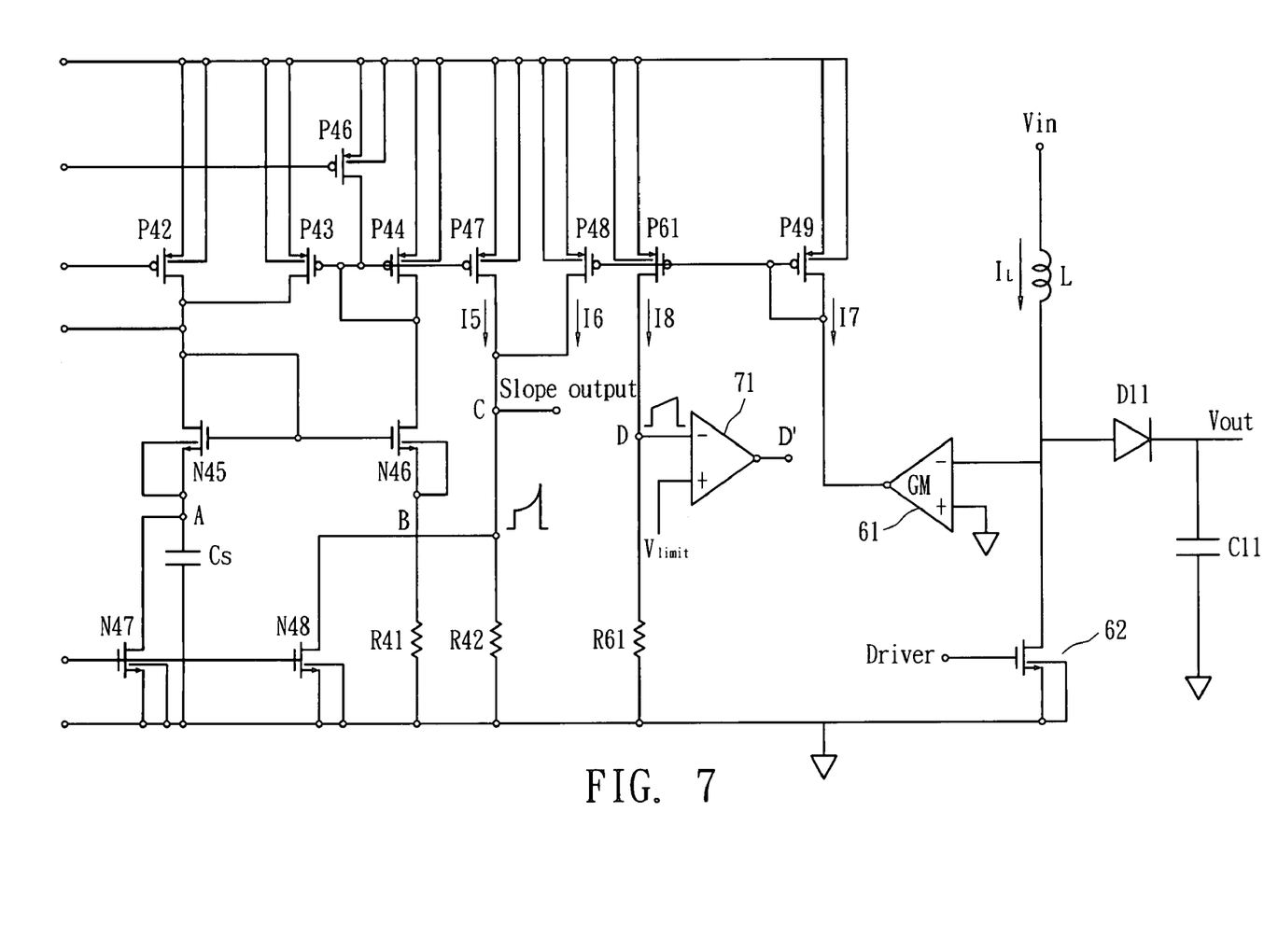
FIG. 7 shows a slope rate compensation circuit in accordance with another embodiment of the present invention.

FIG. 7 shows a slope rate compensation circuit in accordance with another embodiment of the present invention. To prevent the slope rate compensation current from frequently reaching the current limit level under a high duty ratio circumstance, a transistor P61 is added to constitute a current mirror with the transistor P48, P49; therefore the node D voltage is equal to $R3 \times I8 = R3 \times (GM \times I_L \times R_{on})$, which is independent to the slope rate compensation current. The node D voltage is compared with a voltage corresponding to the current limit level through a comparator 71, and outputs the result to the PWM logic circuit 93, as shown in FIG. 9.

Figure 8:
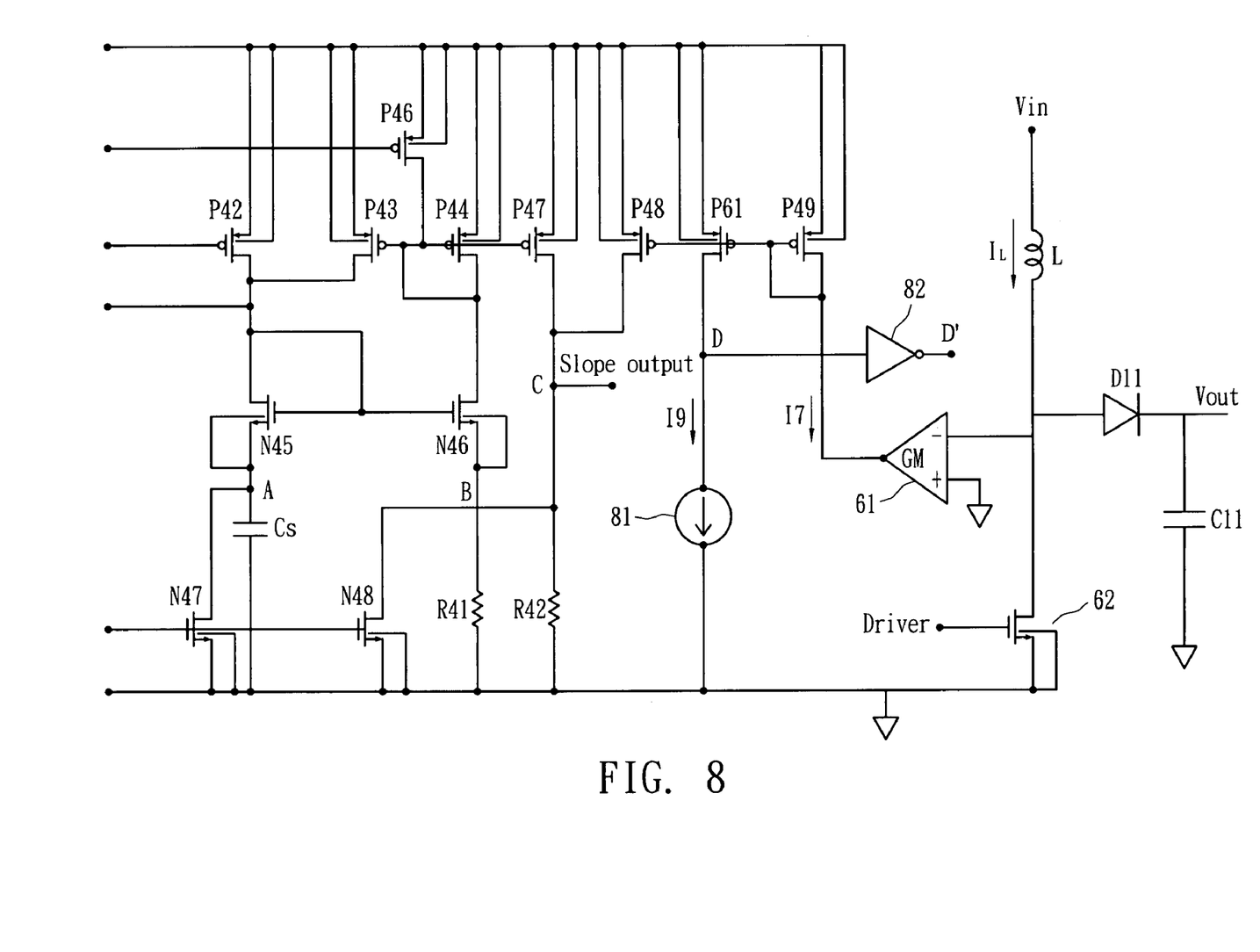
FIG. 8 shows a slope rate compensation circuit in accordance with another embodiment of the present invention.

FIG. 8 shows a slope rate compensation circuit in accordance with another embodiment of the present invention. This embodiment uses a current source 81 to substitute the resistor R61 shown in FIG. 7, and the current of the current source 81 is equal to the current limit level. This embodiment is capable of saving the comparator 71 shown in FIG. 7. If the node D voltage is logic low, it represents that the current limit level has not been reached. In the meantime, the node D' voltage outputted from an inverter 82 is logic high.

Figure 9:
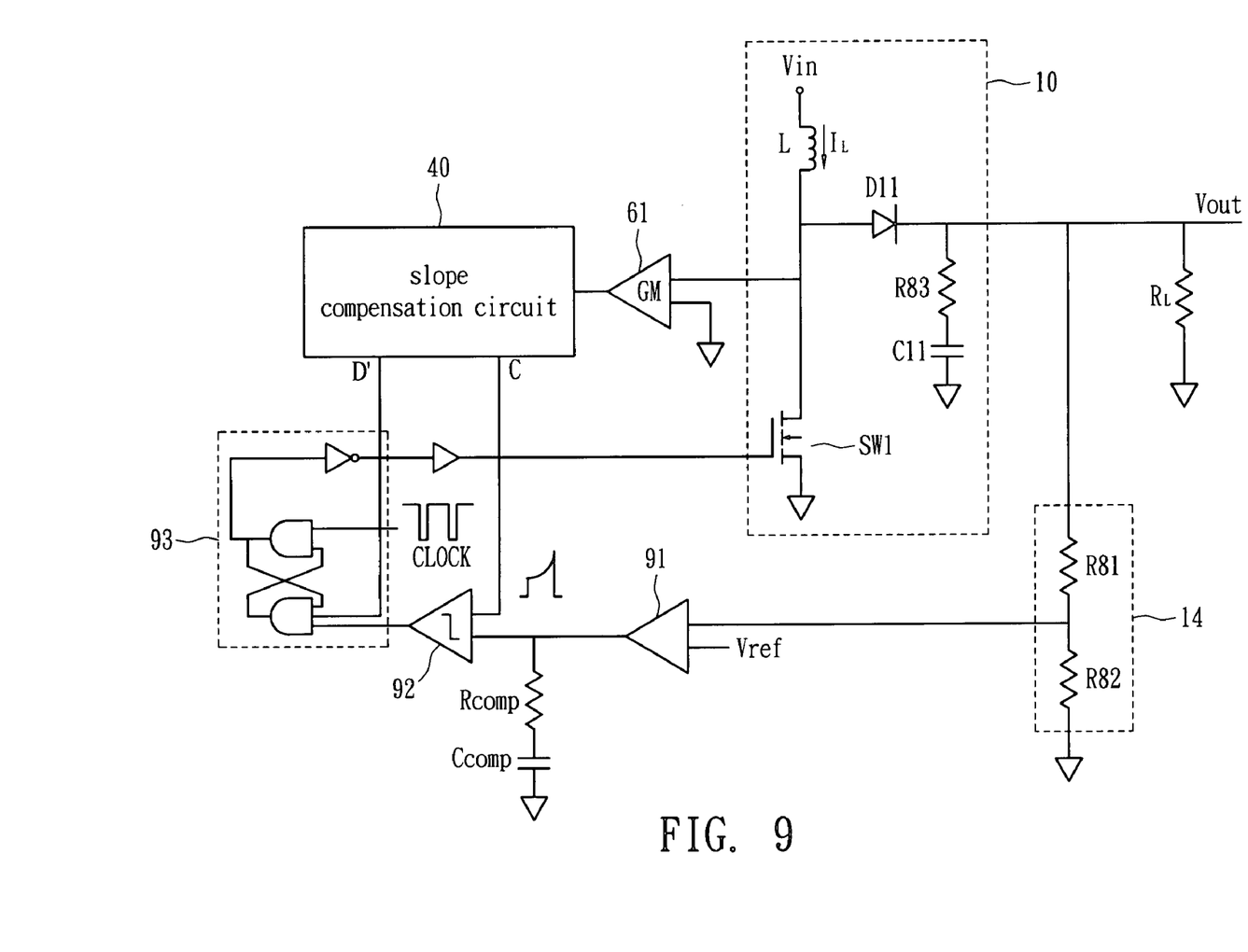
FIG. 9 shows a PWM boost converter circuit in accordance with one embodiment of the present invention.

FIG. 9 shows a PWM boost converter circuit in accordance with one embodiment of the present invention. The PWM boost converter circuit includes a boost converter circuit 10, a voltage divider 14, a pulse width modulator 92, an error amplifier 91, a PWM logic circuit 93, a slope rate compensation circuit 40 and a transconductance amplifier 51. The node C voltage of the slope rate compensation circuit 40 is outputted to the input terminal of the pulse width modulator 92 for comparing with the output of the error amplifier 91. The node D' voltage of the slope rate compensation circuit 40 is outputted to the input terminal of the PWM logic circuit 93. If the inductor current reaches the current limit level, the transistor switch SW1 turns off.

The slope rate compensation method and circuit of the present embodiment are proposed to detect power FET conduction current rather than resistor current, and are well-suited to the existing CMOS process, so the purpose of saving power is met. In addition, the compensated slope rate is varied with the duty ratio changes, and an optimal loop compensation can be achieved accordingly. Furthermore, the slope rate compensation method and circuit are capable of summing the feedback signal of the inductor current and slope rate compensation signal to act as the sawtooth signal for the current-mode PWM control. More importantly, the resistances affecting slope rate parameters appear in both the numerator and denominator, and thus neutralize the factor of process variations. Optionally, the current limit function of the present invention is not affected by the slope rate compensation function.

The above-described embodiments of the present invention are intended to be illustrative only. Numerous alternative embodiments may be devised by persons skilled in the art without departing from the scope of the following claims.

What is claimed is:

1. A slope rate compensation circuit, comprising:
    a source follower level-shift amplifier including a first transistor and a second transistor, wherein the first transistor allows a first current to flow therein, the second transistor allows a second current to flow therein, and the first current increases with the second current;
    a capacitor connected to the source terminal of the first transistor;
    a first resistor connected to the source terminal of the second transistor; and
    a second resistor allowing a third current to flow therein, wherein the third current increases with the second current;
    wherein the second resistor is related to the output voltage of the slope rate compensation circuit.

2. The slope rate compensation circuit of claim 1, wherein the output voltage of the slope rate compensation circuit is proportional to the resistance of the second resistor and is inversely proportional to the resistance of the first resistor.

3. The slope rate compensation circuit of claim 1, wherein the first and second transistors have the same size.

4. The slope rate compensation circuit of claim 1, wherein the shape ratio of the first transistor and that of the second transistor are the same as that of the first current and that of the second current.

5. A slope rate compensation circuit, comprising:
    a compensation unit, wherein the increasing rate of the output voltage of the compensation unit versus time is a constant;
    a transconductance amplifier configured to detect a current value of an inductor; and
    a current mirror configured to reflect the output current of the transconductance amplifier to the compensation unit with a ratio.

6. The slope rate compensation circuit of claim 5, wherein the compensation unit includes a source follower level-shift amplifier, a capacitor, a first resistor and a second resistor, wherein the capacitor and the first resistor are connected to two output terminals of the source follower level-shift amplifier, respectively, and the current flow of the first resistor is proportional to that of the second resistor.

7. The slope rate compensation circuit of claim 5, wherein the input voltage of the transconductance amplifier is the product of the current of the inductor multiplied by the equivalent resistance of an enabled transistor.

8. The slope rate compensation circuit of claim 5, further comprising a comparator, wherein one input terminal of the comparator is connected to a limited voltage, and the other input terminal is connected to the current mirror.

9. The slope rate compensation circuit of claim 5, further comprising a current source and an inverter, wherein the current source and inverter are commonly connected to the current mirror.

10. A pulse width modulation (PWM) boost converter circuit, comprising:
    a slope rate compensation circuit as claimed in claim 5;
    a boost converter circuit having an inductor and a transistor switch;
    a voltage divider connected to the output terminal of the boost converter circuit;
    an error amplifier having a reversed-phase input terminal connected to the output terminal of the voltage divider;

a pulse width modulator having one input terminal connected to the output of the error amplifier, and another input terminal connected to the output voltage of the compensation unit of the slope rate compensation circuit; and a PWM logic circuit having one input terminal connected to the output terminal of the pulse width modulator.

11. The PWM boost converter circuit of claim 10, wherein the slope rate compensation circuit further comprises a comparator, wherein the comparator has one input terminal connected to the current-limiting voltage and the other input terminal connected to the current mirror.

12. The PWM boost converter circuit of claim 11, wherein the PWM logic circuit has another input terminal connected to the output of the comparator.

13. The PWM boost converter circuit of claim 10, further comprising a current source and an inverter, wherein the current source and inverter are commonly connected to the current mirror.

14. The PWM boost converter circuit of claim 13, wherein the PWM logic circuit has another input terminal connected to the output of the inverter.

15. The PWM boost converter circuit of claim 10, wherein the compensation unit of the slope rate compensation circuit comprises a source follower level-shift amplifier, a capacitor, a first resistor and a second resistor, wherein the capacitor and the first resistor are connected to two output terminals of the source follower level-shift amplifier, respectively, and the current of the second resistor is proportional to the current of the first resistor.

16. A slope rate compensation method, comprising the steps of:

detecting an inductor current and generating a feedback signal accordingly;

generating a slope rate compensation signal having a constant increasing slope rate, wherein the variation of the slope rate is proportional to the duty ratio of a PWM control;

summing the feedback signal and the slope rate compensation signal to generate a sawtooth signal; and utilizing the sawtooth signal to perform a current-mode PWM control.

17. The method of claim 16, further comprising the step of performing current limit according to the feedback signal only.

18. The method of claim 16, wherein the feedback signal is obtained by using a transconductance amplifier to detect the inductor current.

* * * * *